(No Model.)
A. B. WHITE.
WHEEL AND AXLE.
No. 413,217. Patented Oct. 22, 1889.
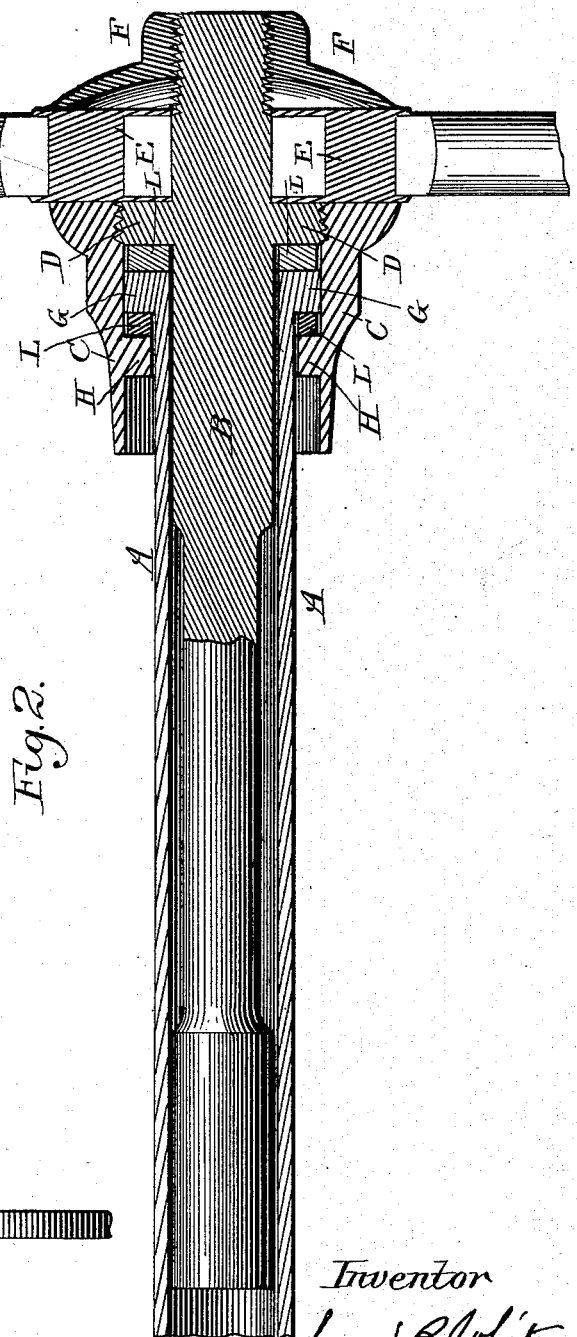
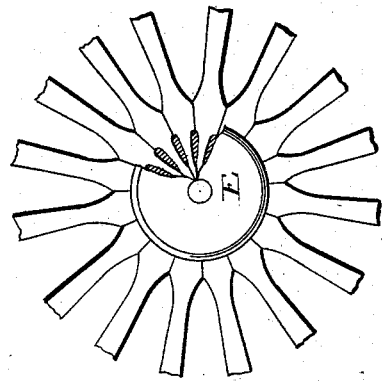
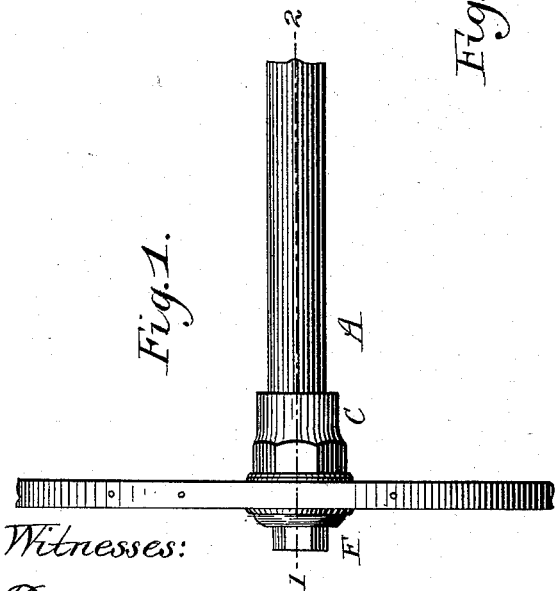
Witnesses:
R. D. Young
Alfred Crandell
Inventor
Aaron B. White

UNITED STATES PATENT OFFICE.

AARON B. WHITE, OF MENDON, MICHIGAN.

WHEEL AND AXLE.

SPECIFICATION forming part of Letters Patent No. 413,217, dated October 22, 1889.

Application filed September 3, 1887. Serial No. 248,759. (No model.)

*To all whom it may concern:*

Be it known that I, AARON B. WHITE, a citizen of the United States, residing at Mendon, in the county of St. Joseph, State of Michigan, have invented a new and useful Wheel and Axle, of which the following is a specification.

My invention relates to improvements in wheels and axles for carriages and other wheeled vehicles; and the objects of my improvements are, first, to attain lightness of construction combined with sufficient strength and also durability; second, to secure neatness by preventing grease from exuding from front of hub, and, third, to make the wheels reversible in case they should become "dished" on the wrong side. I attain these objects by the construction and arrangement of the different parts as illustrated in the accompanying drawings, in which—

Figure 1 represents the wheel and a portion of the axle when put together and ready for use; Fig. 2, a vertical section on the line 1 2, Fig. 1; and Fig. 3 represents a front view of hub with part of disk removed to show form of connections between front and rear disks.

Similar letters refer to similar parts throughout the several views.

The hub E, Fig. 3, consists of two disks held together by oval connections of the form shown in Fig. 3, all being parts of the same casting in this case, but may be secured by rivets passing through the disks and between the spokes. The hub and also the spokes being made of similar form on both sides of the wheel admit of it being reversed in case it should become dished on the wrong side. The arm or shaft B, Fig. 2, is made with a collar D, at sufficient distance from the outer end to receive the hub of wheel, and flanged nut F, which is screwed against it, the hub being held firmly between the flanged nut F and the collar D, causing the arm or shaft B to revolve with the wheel. The axle A, Fig. 2, is made hollow and sleeved upon the arm B, which revolves within it, and is held in place by screw-cap C, hereinafter described, which is placed upon the axle and screwed upon the collar D and against the rear disk of hub and revolves with the wheel. The screw-cap C is made of sufficient length to admit a washer of leather (marked L, Fig. 2) on each side of collar G on end of axle, to prevent rattling and friction of metals, and with an inner flange H, which is fitted to axle and which, by coming in contact with collar G, prevents the arm B from slipping out of axle, and also with a rim extending in rear of inner flange sufficiently to prevent sand or other injurious substance from entering the wearing parts, thereby securing durability.

I am aware that prior to my invention vehicles have been made with wheels rigidly connected to revolving arms, and also others with hollow axles, and still others in which the wheel was fastened at the rear end of hub. I therefore do not claim all points of utility, broadly; but What I do claim as my invention, and desire to secure by Letters Patent, is—

The combination of hollow axle A with arm B revolving within it and held in position by screw-cap C, in connection with collars D and G, with the hub E, rigidly secured by flanged nut F, all constructed and operating substantially as described.

AARON B. WHITE.

Witnesses:
GEO. B. REED,
G. P. DOAN.